United States Patent
Hornung et al.

(10) Patent No.: US 9,464,153 B2
(45) Date of Patent: Oct. 11, 2016

(54) PREMIX AND METHOD FOR PRODUCING A THERMALLY EXPANDABLE AND CURABLE EPOXY-BASED COMPOUND

(75) Inventors: Martin Hornung, Heidelberg (DE); Emilie Barriau, Laguna Niguel, CA (US); Martin Renkel, Duesseldorf (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 13/456,707

(22) Filed: Apr. 26, 2012

(65) Prior Publication Data

US 2012/0207925 A1    Aug. 16, 2012

Related U.S. Application Data

(63) Continuation of application No. PCT/EP2010/066442, filed on Oct. 29, 2010.

(30) Foreign Application Priority Data

Oct. 29, 2009 (DE) .................. 10 2009 046 157

(51) Int. Cl.
| | |
|---|---|
| *C08G 18/58* | (2006.01) |
| *C08G 18/00* | (2006.01) |
| *C08J 9/32* | (2006.01) |
| *C08G 101/00* | (2006.01) |
| *C08K 7/28* | (2006.01) |

(52) U.S. Cl.
CPC ............ *C08G 18/003* (2013.01); *C08G 18/58* (2013.01); *C08J 9/32* (2013.01); *C08G 2101/00* (2013.01); *C08J 2203/22* (2013.01); *C08J 2375/04* (2013.01); *C08K 7/28* (2013.01)

(58) Field of Classification Search
CPC  C08G 18/003; C08G 18/58; C08G 2101/00; C08J 9/32; C08J 2203/22; C08J 2375/04; C08K 7/28

USPC ........ 521/135, 137, 156, 161, 170, 175, 178
See application file for complete search history.

(56) References Cited

U.S. PATENT DOCUMENTS

| | | | |
|---|---|---|---|
| 4,258,137 A * | 3/1981 | Cogliano ..................... 521/55 |
| 4,789,690 A | 12/1988 | Milovanovic-Lerik et al. |
| 5,453,186 A | 9/1995 | Muller et al. |
| 7,241,502 B2 | 7/2007 | Anselmann et al. |
| 7,473,717 B2 * | 1/2009 | Muenz et al. ............... 521/135 |
| 2004/0131840 A1 | 7/2004 | Ferguson et al. |
| 2005/0043420 A1 * | 2/2005 | Agarwal ..................... 521/82 |
| 2006/0052570 A1 | 3/2006 | Gan et al. |
| 2011/0257285 A1 * | 10/2011 | Barriau et al. ............... 521/156 |
| 2012/0183694 A1 * | 7/2012 | Olang ......................... 427/340 |

FOREIGN PATENT DOCUMENTS

| | | |
|---|---|---|
| CA | 2587477 A1 | 5/2006 |
| EP | 337144 A1 | 10/1989 |
| WO | 02088214 A1 | 11/2002 |
| WO | 2004111136 A1 | 12/2004 |
| WO | 2007004184 A1 | 1/2007 |
| WO | 2007025007 A1 | 3/2007 |
| WO | 2009017690 A2 | 2/2009 |

OTHER PUBLICATIONS

Carrot, G. et al. "Atom Transfer Radical Polymerization of n-Butyl Acrylate from Silica Nanoparticles," J. Polym. Sci., Part A Polymer Chemistry, John Wiley & Sons, Inc., vol. 39, 2001, pp. 4294-4301.
International Search Report for PCT/EP2010/066442, mailed Feb. 23, 2011.

* cited by examiner

*Primary Examiner* — John Cooney
(74) *Attorney, Agent, or Firm* — Mary K. Cameron

(57) ABSTRACT

A two-component premix for preparing a heat-expandable and heat-curable epoxy-based material, comprises an isocyanate, a diol or polyol, an epoxy prepolymer, a heat-activatable hardener for epoxy prepolymers, and a heat-activatable blowing agent.

14 Claims, No Drawings

PREMIX AND METHOD FOR PRODUCING A THERMALLY EXPANDABLE AND CURABLE EPOXY-BASED COMPOUND

CROSS-REFERENCE TO RELATED APPLICATIONS

This application is a continuation of International Patent Application No. PCT/EP2010/066442 filed Oct. 29, 2010, which claims priority to German Patent Application No. 102009046157.4 filed Oct. 29, 2009, the contents of both of which are incorporated herein by reference.

The present invention relates to expandable and curable epoxy resin mixtures, which in the expanded and cured state can be used as structural foams for stiffening metallic hollow structures in particular, and to a method for the production thereof. Said method involves preparing two readily pumpable premixes, mixing them together, and allowing them to pre-cure in a mold to form a dimensionally stable molding. Pre-curing is based on the formation of a polyurethane from an alcohol component in the one component and from an isocyanate component in the other component of the premix. Final curing to form a structural foam takes place later on heating, based on the heat-induced curing reaction of epoxy resin prepolymers.

Lightweight components for a constantly dimensionally stable series production with high rigidity and structural strength are needed for many fields of application. In automotive construction in particular, because of the desired weight savings in that sector, there is a high demand for lightweight components made from thin-wall structures that nevertheless have adequate rigidity and structural strength. One way of achieving high rigidity and structural strength combined with the lowest possible component weight uses hollow components manufactured from relatively thin sheet metal or plastic sheets. Thin-wall sheet metal is very prone to deformation, however. In the case of hollow structures it has thus been known for some time to pack this cavity with a structural foam, which on the one hand prevents or minimizes deformation and on the other increases the strength and rigidity of these components.

Such expanded reinforcing and stiffening agents are conventionally either metal foams or they contain a heat-curable resin or binder such as epoxy resins for example. These compositions generally contain a blowing agent, fillers and reinforcing fillers such as for example hollow glass microbeads. In the expanded and cured state such foams preferably have a density of 0.3 to 0.7 $g/cm^3$. After being cured, these foams should withstand temperatures of over 130° C., preferably over 150° C., without damage, at least in the short term. Such expandable, heat-curable compositions generally contain further constituents, such as curing agents, processing aids, stabilizers, dyes or pigments, optionally UV absorbers and adhesion-reinforcing constituents.

WO 2007/004184 describes a heat-expandable material containing the following components: a solid epoxy resin, a toughener, a hardener, and a heat-activatable blowing agent. The toughener can be a thermoplastic material. The following are cited by way of example: epoxy-polyurethane hybrids and isocyanate prepolymers, for example isocyanate-terminated polyether polyols.

WO 2007/025007 discloses a composition containing the following components: at least one epoxy resin, rubber particles having a core-shell structure, a further impact modifier or toughener, and a heat-activatable latent hardener. The composition can additionally contain blowing agents, such that it can be used as a structural foam. Polyurethanes deriving from hydroxyl-terminated polyoxyalkylenes, such as for example polypropylene glycol or polytetrahydrofuran diol, are cited for example as impact modifiers.

WO 2009/017690 describes curable epoxy resin-based adhesive compositions, which can also contain blowing agents. In one embodiment the composition contains at least one epoxy resin and at least one polyurethane. WO 2002/088214 discloses heat-curable compositions for structural foams, which contain a reaction product of an isocyanate resin with an epoxy resin bearing isocyanate-reactive groups, for example hydroxyl groups.

Three-dimensional parts made from structural foams are conventionally used today in injection molding. Owing to the tackiness of the materials at temperatures above 30° C., the starting material for manufacturing parts by injection molding cannot be used in granular form. In order nevertheless to be able to manufacture parts by this method, the material feed to the injection molding machine has to be modified at some considerable cost. A special feed is required, which means that parts cannot be manufactured on a free choice of commercial injection molding machines. If formulations having a relatively high melting point are used, in order to increase the softening point to approximately 40° C., the structural foam part must be processed at elevated temperatures in the injection molding machine in order to fill the molds. Temperatures above 100° C. are not permissible, since otherwise the curing reaction of the composition is initiated and this can cause the machine to block. Due to the high viscosity at temperatures just above the melting point of the epoxy resins and in particular to the tackiness of the liquefied epoxy resins, the production of injection molded parts is possible only in very poor quality and with considerable technical effort.

The present invention proposes a solution to this problem. It is based on the fact that instead of a high-viscosity material, two low-viscosity premixes are pumped or sprayed into the mold and a molding that is dimensionally stable at room temperature or above (for example up to 40° C.) forms only as a result of a polyurethane forming reaction in the mold.

The present invention thus relates to a two-component premix for preparing a heat-expandable and heat-curable epoxy-based material, comprising a component A and a component B, component A containing at least one isocyanate and component B containing at least one diol or polyol and additionally at least one of components A or B containing at least one epoxy prepolymer, at least one of components A or B containing a heat-activatable hardener for epoxy prepolymers and at least one of components A and B containing a heat-activatable blowing agent.

For reasons of improved handling (e.g. suitable viscosity of both components), it is preferable for component A to contain at least one epoxy prepolymer and at least one isocyanate and for component B to contain at least one epoxy prepolymer and at least one diol or polyol, at least one of components A or B additionally containing a heat-activatable hardener for epoxy prepolymers and at least one of components A or B containing a heat-activatable blowing agent.

In a further embodiment of the present invention it has however proved advantageous for component A to contain at least one isocyanate and component B at least one epoxy prepolymer and at least one diol or polyol, at least one of components A or B additionally containing a heat-activatable hardener for epoxy prepolymers and at least one of components A or B containing a heat-activatable blowing agent.

In a most particularly preferred embodiment it has proved advantageous for only component B to contain an epoxy resin, in other words for component A to be formulated free from epoxy resins. Preparations are "free from epoxy resins" according to the invention if they contain less than 3 wt. %, preferably less than 1 wt. %, most particularly preferably less than 0.1 wt. % of an epoxy resin. Such compositions are distinguished in particular by an increased storage stability.

The epoxy prepolymers, also referred to below as "epoxy resins", can in principle be saturated, unsaturated, cyclic or acyclic, aliphatic, alicyclic, aromatic or heterocyclic polyepoxy compounds.

Suitable epoxy resins are selected for example from epoxy resins of the bisphenol A type, epoxy resins of the bisphenol S type, epoxy resins of the bisphenol F type, epoxy resins of the phenol-novolak type, epoxy resins of the cresol-novolak type, epoxidized products of numerous dicyclopentadiene-modified phenolic resins, obtainable by reacting dicyclopentadiene with numerous phenols, epoxidized products of 2,2',6,6'-tetramethylbiphenol, aromatic epoxy resins such as epoxy resins having a naphthalene framework and epoxy resins having a fluorene framework, aliphatic epoxy resins such as neopentyl glycol diglycidyl ether and 1,6-hexanediol diglycidyl ether, alicyclic epoxy resins such as 3,4-epoxycyclohexylmethyl-3,4-epoxycyclohexane carboxylate and bis(3,4-epoxycyclohexyl)adipate and epoxy resins having a heterocyclic ring such as triglycidyl isocyanurate. In particular the epoxy resins encompass for example the reaction product of bisphenol A and epichlorohydrin, the reaction product of phenol and formaldehyde (novolak resins) and epichlorohydrin, glycidyl esters and the reaction product of epichlorohydrin and p-aminophenol.

Further polyphenols that yield suitable epoxy resin prepolymers by reaction with epichlorohydrin (or epibromohydrin) are: resorcinol, 1,2-dihydroxybenzene, hydroquinone, bis(4-hydroxyphenyl)-1,1-isobutane, 4,4'-dihydroxybenzophenone, bis(4-hydroxyphenyl)-1,1-ethane and 1,5-hydroxynaphthalene.

Further suitable epoxy prepolymers are polyglycidyl ethers of polyalcohols or diamines. Such polyglycidyl ethers derive from polyalcohols, such as for example ethylene glycol, diethylene glycol, triethylene glycol, 1,2-propylene glycol, 1,4-butylene glycol, triethylene glycol, 1,5-pentanediol, 1,6-hexanediol or trimethylolpropane.

Further preferred epoxy resins that are commercially available encompass in particular octadecylene oxide, epichlorohydrin, styrene oxide, vinyl cyclohexene oxide, glycidol, glycidyl methacrylate, diglycidyl ethers of Bisphenol A (e.g. those that are obtainable under the trade names "Epon 828", "Epon 825", "Epon 1004" and "Epon 1010" from Hexion Specialty Chemicals Inc., "DER-331", "DER-332", "DER-334", "DER-671", "DER-732" and "DER-736" from Dow Chemical Co.), vinyl cyclohexene dioxide, 3,4-epoxycyclohexylmethyl-3,4-epoxycyclohexene carboxylate, 3,4-epoxy-6-methylcyclohexylmethyl-3,4-epoxy-6-methyl cyclohexene carboxylate, bis(3,4-epoxy-6-methylcyclohexylmethyl)adipate, bis(2,3-epoxycyclopentyl)ether, aliphatic, polypropylene glycol-modified epoxy, dipentene dioxide, epoxidized polybutadiene (e.g. Kresol products from Sartomer), silicone resin containing epoxy functionalities, flame-retardant epoxy resins (e.g. "DER-580", a brominated epoxy resin of the bisphenol type, obtainable from Dow Chemical Co.), 1,4-butanediol diglycidyl ethers of a phenol-formaldehyde novolak (e.g. "DEN-431" and "DEN-438" from Dow Chemical Co.), and resorcinol diglycidyl ethers (e.g. "Kopoxite" from Koppers Company Inc.), bis (3,4-epoxycyclohexyl)adipate, 2-(3,4-epoxycyclohexyl-5,5-spiro-3,4-epoxy)cyclohexane metadioxane, vinyl cyclohexene monoxide, 1,2-epoxyhexadecane, alkyl glycidyl ethers such as for example C8-C10 alkyl glycidyl ethers (e.g. "HELOXY Modifier 7" from Hexion Specialty Chemicals Inc.), C12-C14 alkyl glycidyl ethers (e.g. "HELOXY Modifier 8" from Hexion Specialty Chemicals Inc.), butyl glycidyl ethers (e.g. "HELOXY Modifier 61" from Hexion Specialty Chemicals Inc.), cresyl glycidyl ethers (e.g. "HELOXY Modifier 62" from Hexion Specialty Chemicals Inc.), p-tert-butylphenyl glycidyl ethers (e.g. "HELOXY Modifier 65" from Hexion Specialty Chemicals Inc.), polyfunctional glycidyl ethers such as for example diglycidyl ethers of 1,4-butanediol (e.g. "HELOXY Modifier 67" from Hexion Specialty Chemicals Inc.), diglycidyl ethers of neopentyl glycol (e.g. "HELOXY Modifier 68" from Hexion Specialty Chemicals Inc.), diglycidyl ethers of cyclohexane dimethanol (e.g. "HELOXY Modifier 107" from Hexion Specialty Chemicals Inc.), trimethylolethane triglycidyl ethers (e.g. "HELOXY Modifier 44" from Hexion Specialty Chemicals Inc.), trimethylolpropane triglycidyl ethers (e.g. "HELOXY Modifier 48" from Hexion Specialty Chemicals Inc.), polyglycidyl ethers of an aliphatic polyol (e.g. "HELOXY Modifier 84" from Hexion Specialty Chemicals Inc.), polyglycol diepoxide (e.g. "HELOXY Modifier 32" from Hexion Specialty Chemicals Inc.), bisphenol F epoxies (e.g. "EPN-1138" or GY-281" from Huntsman Int. LLC), 9,9-bis-4-(2,3-epoxypropoxy)phenyl fluorenone (e.g. "Epon 1079" from Hexion Specialty Chemicals Inc.).

Further preferred commercially available compounds are selected for example from Araldite™ 6010, Araldite™ GY-281™, Araldite™ ECN-1273, Araldite™ ECN-1280, Araldite™ MY-720, RD-2 from Huntsman Int. LLC; DEN™ 432, DEN™ 438, DEN™ 485 from Dow Chemical Co., Epon™ 812, 826, 830, 834, 836, 871, 872, 1001, 1002, 1031 etc. from Hexion Specialty Chemicals Inc. and HPT™ 1071, HPT™ 1079 likewise from Hexion Specialty Chemicals Inc., as novolak resins also for example Epi-Rez™ 5132 from Hexion Specialty Chemicals Inc., ESCN-001 from Sumitomo Chemical, Quatrex 5010 from Dow Chemical Co., RE 305S from Nippon Kayaku, Epiclon™ N673 from DaiNipon Ink Chemistry or Epicote™ 152 from Hexion Specialty Chemicals Inc.

Furthermore, at least small proportions of the following polyepoxides can be used: polyglycidyl esters of polycarboxylic acids, for example reaction products of glycidol or epichlorohydrin with aliphatic or aromatic polycarboxylic acids such as oxalic acid, succinic acid, glutaric acid, terephthalic acid or dimer fatty acid.

The epoxy equivalent of suitable polyepoxides can vary between 150 and 50,000, preferably between 170 and 5000. For example, an epoxy resin based on epichlorohydrin/bisphenol A that has an epoxy equivalent weight of 475 to 550 g/eq or an epoxy group content in the range from 1820 to 2110 mmol/g is suitable. The softening point determined in accordance with RPM 108-C is in the range from 75 to 85° C.

The heat-expandable and heat-curable material can contain at least one epoxy prepolymer that is liquid at room temperature (22° C.). This lowers the viscosity of the premix and thus makes it easier to introduce the two premixes into the mold.

It is therefore preferable for at least one of components A or B, preferably both component A and component B, to contain an epoxy prepolymer that is liquid at 22° C.

It can however also be preferable for at least one of components A or B, preferably component B, to contain an epoxy prepolymer that is liquid at 22° C.

Reaction products of epichlorohydrin with bisphenol A or bisphenol F are preferably used as epoxy prepolymers that are liquid at room temperature. The epoxy resins that are liquid at room temperature generally have an epoxy equivalent weight of approximately 150 to approximately 480. An epoxy equivalent weight range from 182 to 350 is particularly preferred.

It is likewise preferable, however, for at least one of components A or B, preferably at least component B, to contain in addition to the epoxy prepolymer that is liquid at 22° C. an epoxy prepolymer that is solid or semi-solid at 22° C. This helps to ensure that the moldings have the necessary strength after pre-curing, and it reduces the tackiness of the moldings in comparison to moldings containing only liquid epoxy resin prepolymers.

The epoxy resins that are solid at room temperature (22° C.) are likewise obtainable from polyphenols and epichlorohydrin. Those based on bisphenol A or bisphenol F and having a melting point between 45° C. and 90° C., preferably between 50° C. and 80° C., are particularly preferred. The latter differ from the liquid epoxy resins substantially through their higher molecular weight, which causes them to solidify at room temperature. According to the invention the solid epoxy resins have an epoxy equivalent weight of 400. An epoxy equivalent weight of 450 to approximately 900 is particularly preferred. The properties of semi-solid epoxy resins at 22° C. are between those of solid and liquid epoxy resins. Unlike liquid epoxy resins, they do not assume the shape of the vessel within 10 minutes under the influence of gravitational force and form a substantially smooth surface, but they are dimensionally stable under the influence of gravitational force for at least 10 minutes. They can however be deformed under manually exerted pressure without breaking, or on release of the pressure they at least approximately assume their original shape again. Semi-solid epoxy resins are therefore readily manually deformable but not elastic.

The difunctional isocyanates (diisocyanates), trifunctional isocyanates (triisocyanates) and/or polyisocyanates known for adhesive applications are suitable as "isocyanates" within the meaning of the present invention. "Polyisocyanates" are understood according to the invention to be compounds having more than three isocyanate groups.

In addition to the monomeric di-, tri- and/or polyisocyanates, the oligomeric and/or polymeric di-, tri- and/or polyisocyanates (reactive prepolymers) are also included among the "isocyanates" according to the invention. An "oligomer" is understood according to the invention to be a compound having fewer than 4 repeating units. Correspondingly, a "polymer" is understood to be a compound having 4 or more repeating units.

Examples of suitable monomeric di-, tri- or polyisocyanates are 1,5-naphthylene diisocyanate, 2,2'-, 2,4- and/or 4,4'-diphenylmethane diisocyanate (MDI), hydrogenated MDI (H12MDI), allophanates of MDI, xylylene diisocyanate (XDI), tetramethyl xylylene diisocyanate (TMXDI), 4,4'-diphenyldimethyl methane diisocyanate, di- and tetraalkylene diphenylmethane diisocyanate, 4,4'-dibenzyl diisocyanate, 1,3-phenylene diisocyanate, 1,4-phenylene diisocyanate, isomers of toluylene diisocyanate (TDI), 1-methyl-2,4-diisocyanatocyclohexane, 1,6-diisocyanato-2,2,4-trimethyl hexane, 1,6-diisocyanato-2,4,4-trimethylhexane, 1-isocyanatomethyl-3-isocyanato-1,5,5-trimethylcyclohexane (IPDI), chlorinated and brominated diisocyanates, phosphorus-containing diisocyanates, 4,4'-diisocyanatophenyl perfluoroethane, tetramethoxybutane-1,4-diisocyanate, butane-1,4-diisocyanate, hexane-1,6-diisocyanate (HDI), dicyclohexyl methane diisocyanate, cyclohexane-1,4-diisocyanate, ethylene diisocyanate, phthalic acid bis-isocyanatoethyl ester, trimethyl hexamethylene diisocyanate, 1,4-diisocyanatobutane, 1,12-diisocyanatododecane, dimer fatty acid diisocyanate. Aliphatic isocyanates such as hexamethylene diisocyanate, undecane-, dodecamethylene diisocyanate, 2,2,4-trimethylhexane-2,3,3-trimethyl hexamethylene, 1,3- or 1,4-cyclohexane diisocyanate, 1,3- or 1,4-tetramethyl xylene diisocyanate, isophorone diisocyanate, 4,4-dicyclohexylmethane, lysine ester diisocyanate or tetramethyl xylylene diisocyanate (TMXDI) are particularly suitable.

Difunctional isocyanates are preferred. At least small proportions of trifunctional isocyanates can also be used, however. Isocyanates that are produced by trimerization or oligomerization of diisocyanates or by reacting diisocyanates with polyfunctional compounds containing hydroxyl or amino groups are suitable as trifunctional isocyanates. Suitable isocyanates for producing trimers are the diisocyanates already mentioned above, the trimerization products of HDI, TMXDI or IPDI being particularly preferred. Also preferred according to the invention are the polymeric di-, tri- or polyisocyanates, such as in particular polymeric MDI, and mixtures of polymeric di-, tri- or polyisocyanates with monomeric di-, tri- or polyisocyanates.

The polyols known from polyurethane technology having a molecular weight of up to 50,000 g/mol can be selected as diols or polyols. They can be selected for example on the basis of polyethers, polyesters, polyolefins, polyacrylates or polyamides, wherein these polymers must additionally have OH groups. Di- or trifunctional polyethylene polyether polyols are suitable for example.

Suitable polyether polyols are for example linear or branched polyethers having a plurality of ether bonds and containing at least two alcohol groups, preferably at the chain ends. They substantially contain no functional groups other than the OH groups. Such polyether polyols are formed as reaction products of low-molecular-weight polyfunctional alcohols with alkylene oxides. The alkylene oxides preferably have two to four C atoms. The reaction products of ethylene oxide, propylene oxide, butylene oxide or mixtures thereof with aliphatic diols, such as ethylene glycol, 1,2-propanediol, 1,3-propanediol, the isomeric butanediols, such as 1,2-butanediol, 1,3-butanediol, 1,4-butanediol and 2,3-butanediol, pentanediols and hexanediols, 2,2-dimethyl-1,3-propanediol, 2-methyl propanediol, polyglycerol, 1,6-hexanediol, 2,4,4-trimethyl hexanediol-1, 6,2,2,4-trimethyl hexanediol-1,6,1,4-cyclohexane dimethanol, or aromatic diols, such as 4,4'-dihydroxydiphenylpropane, bisphenol A, bisphenol F, pyrocatechol, resorcinol, hydroquinone or mixtures of two or more thereof are suitable for example. Further polyols that are suitable within the context of the invention are formed by polymerization of tetrahydrofuran (poly-THF). The reaction products of polyfunctional alcohols such as glycerol, trimethylolethane or trimethylolpropane, pentaerythritol or sugar alcohols with the alkylene oxides are moreover also suitable. They have the same number of terminal OH groups as the starting alcohol.

Polyester polyols can also be used in place of or together with the polyether polyols. They are formed by a polycondensation reaction of a polyhydric alcohol having for example 2 to 15 C atoms and preferably 2 or 3 OH groups with one or more polycarboxylic acids, preferably those having 2 to 14 C atoms (including the C atoms in the carboxyl groups) and having 2 to 6 carboxyl groups. Dicarboxylic acids are preferred here that together with diols lead to linear polyester diols or together with triols lead to branched polyester triols. Conversely, branched polyester triols can also be obtained by reacting a diol with a tricarboxylic acid. The following for example can be used as the alcohol component of the polyester polyol: ethylene glycol, 1,2-propanediol, 1,3-propanediol, the isomeric butanediols, pentanediols, hexanediols, 2,2-dimethyl-1,3-propanediol, 2-methyl propanediol, 1,6-hexanediol, 2,4,4-trimethyl hexanediol-1,6,2,2,4-trimethyl hexanediol-1,6, cyclohexanediol-1,4,1,4-cyclohexane dimethanol, or aromatic diols, such as 4,4'-dihydroxydiphenyl propane, bisphenol A, bisphenol F, pyrocatechol, resorcinol, hydroquinone. Suitable carboxylic acids are for example: phthalic acid, isophthalic acid, terephthalic acid, maleic acid, dodecyl maleic acid, octadecenyl maleic acid, fumaric acid, aconitic acid, 1,2,4-benzene tricarboxylic acid, 1,2,3-propane tricarboxylic acid, malonic acid, succinic acid, glutaric acid, adipic acid, pimelic acid, sebacic acid, cyclohexane-1,2-dicarboxylic acid, 1,4-cyclohexadiene-1,2-dicarboxylic acid and others. In place of the carboxylic acids, anhydrides thereof can also be used.

By virtue of the crosslinking characteristics that are particularly suitable for the application according to the invention, it is preferable to use diisocyanates in combination with trifunctional polyols and/or aliphatic diols. Polyethylene polyether polyols and/or butanediols, in particular 1,4-butanediol, can be most particularly preferred representatives of the group of diols or polyols.

Heat-activatable or latent hardeners for the epoxy resin prepolymer are used as hardeners for epoxy prepolymers. These can be selected from the following compounds for example: guanidines, substituted guanidines, substituted ureas, melamine resins, guanamine derivatives, cyclic tertiary amines, aromatic amines and/or mixtures thereof. The hardeners can be incorporated stoichiometrically into the curing reaction, but they can also be catalytically active. Examples of substituted guanidines are methylguanidine, dimethylguanidine, trimethylguanidine, tetramethylguanidine, methyl isobiguanidine, dimethyl isobiguanidine, tetramethyl isobiguanidine, hexamethyl isobiguanidine, heptamethyl isobiguanidine and most particularly cyanoguanidine (dicyandiamide). Alkylated benzoguanamine resins, benzoguanamine resins or methoxymethyl ethoxymethyl benzoguanamine are cited as representatives of suitable guanamine derivatives. Dicyandiamide is preferably suitable.

In addition to the aforementioned hardeners, catalytically active substituted ureas can be used. These are in particular p-chlorophenyl-N,N-dimethyl urea (monuron), 3-phenyl-1,1-dimethyl urea (fenuron) or 3,4-dichlorophenyl-N,N-dimethyl urea (diuron). Catalytically active tertiary acrylic or alkyl amines, such as for example benzyl dimethylamine, tris(dimethylamino)phenol, piperidine or piperidine derivatives, can also be used in principle. Furthermore, various preferably solid imidazole derivatives can be used as catalytically active accelerators. 2-Ethyl-2-methyl imidazole, N-butyl imidazole, benzimidazole and N—$C_1$ to $C_{12}$ alkyl imidazoles or N-aryl imidazoles are cited as representatives. Adducts of amino compounds with epoxy resins are also suitable as accelerating additives for the aforementioned hardeners. Suitable amino compounds are tertiary aliphatic, aromatic or cyclic amines. Suitable epoxy compounds are for example polyepoxides based on glycidyl ethers of bisphenol A or F or of resorcinol. Specific examples of such adducts are adducts of tertiary amines such as 2-dimethyl aminoethanol, N-substituted piperazines, N-substituted homopiperazines, N-substituted aminophenols with di- or polyglycidyl ethers of bisphenol A or F or of resorcinol.

In the context of the present invention it is preferable but not absolutely necessary for at least one of components A and B additionally to contain one such curing accelerator for epoxy prepolymers, in particular adducts of amino compounds with epoxy resins.

All known blowing agents are suitable in principle as blowing agents, such as for example "chemical blowing agents" that release gases due to decomposition, or "physical blowing agents", i.e. expanding hollow beads. Examples of the first-mentioned blowing agents are azobisisobutyronitrile, azodicarbonamide, dinitrosopentamethylene tetramine, 4,4'-oxybis(benzenesulfonic acid hydrazide), diphenylsulfone-3,3'-disulfohydrazide, benzene-1,3-disulfohydrazide, p-toluenesulfonyl semicarbazide. Expandable hollow plastic microbeads based on polyvinylidene chloride copolymers or acrylonitrile/(meth)acrylate copolymers are particularly preferred. These are commercially available for example under the names "Dualite" and "Expancel®" from Pierce & Stevens and Casco Nobel respectively.

The amount of blowing agent is preferably chosen such that the volume of the material pre-cured after combining components A and B is irreversibly increased on heating to activation temperature (or expansion temperature) by at least 10%, preferably at least 20% and in particular at least 50%. This is understood to mean that in addition to the normal and reversible thermal expansion according to its coefficient of thermal expansion, the material irreversibly increases its volume in comparison to the starting volume at room temperature (22° C.) on heating to the activation temperature, such that after cooling back down to room temperature it is at least 10%, preferably at least 20% and in particular at least 50% greater than before. The cited degree of expansion thus relates to the volume of the material at room temperature before and after temporary heating to the activation temperature. The upper limit of the degree of expansion, in other words of the irreversible increase in volume, can be adjusted through the choice of the amount of blowing agent such that it is below 300%, in particular below 200%.

The activation temperature is preferably in the range from 120 to 220° C. This temperature should preferably be maintained for a period in the range from 10 to 150 minutes.

To accelerate the pre-curing of the combined premixes to form polyurethane it is preferable for at least one of components A and B (preferably B) additionally to contain a curing catalyst for isocyanates. Dialkyl tin dicarboxylates, such as for example dibutyl tin dicarboxylates, are suitable for this purpose for example. The carboxylate groups can be selected from those having in total (i.e. including the carboxyl group) 2 to 18 C atoms. Acetic acid, propionic acid, butyric acid, valeric acid, hexanoic acid, octanoic acid, decanoic acid, lauric acid, palmitic acid and stearic acid for example are suitable as carboxylic acids for forming carboxylates. Dibutyl tin dilaurate is suitable in particular. Furthermore, organometallic compounds based on bismuth and zinc such as for example bismuth zinc neodecanoate or alternatively purely organic accelerators such as dimethyl benzylamine or diazabicyclooctane can be used.

Component A contains, relative to the entire component A, preferably 5 to 100 wt. %, in particular 8 to 85 wt. % of isocyanate, most particularly preferably 8 to 75 wt. % of isocyanate.

Furthermore, one or both of the following conditions preferably applies to the composition of component A:

The percentage by weight of epoxy prepolymer, relative to the entire component A, is 25 to 50 wt. %, preferably 30 to 45 wt. %;

The percentage by weight of isocyanate, relative to the entire component A, is 5 to 40 wt. %, preferably 8 to 35 wt. %.

It is particularly preferable for both of these conditions to apply simultaneously.

Alternatively, it can be preferable for the composition of component A for one or both of the following conditions to apply:

The percentage by weight of epoxy prepolymer, relative to the entire component A, is 0 to 50 wt. %, preferably 0 to 45 wt. %;

The percentage by weight of isocyanate, relative to the entire component A, is 5 to 90 wt. %, preferably 10 to 85 wt. %.

It is particularly preferable for both of these conditions to apply simultaneously.

Components A in particular, which are formulated to be free from epoxy prepolymers, are distinguished by improved storage stability.

Component A can additionally contain one or more, preferably all, of the following constituents, relative to the entire component A:
i) 1 to 5 wt. %, preferably 2 to 4 wt. %, of heat-activatable blowing agent,
ii) 0 to 30 wt. %, preferably 5 to 20 wt. %, of lightweight filler,
iii) 0.5 to 5 wt. %, preferably 1 to 4 wt. %, of water-binding agent such as for example calcium oxide,
iv) 0.1 to 5 wt. %, preferably 1 to 4 wt. %, of curing accelerator.

Alternatively, component A can contain one or more, preferably all, of the following constituents, relative to the entire component A:
i) 0 to 20 wt. %, preferably 2 to 10 wt. %, of heat-activatable blowing agent,
ii) 0 to 30 wt. %, preferably 5 to 20 wt. %, of lightweight filler,
iii) 0.5 to 6 wt. %, preferably 1 to 5 wt. %, of water-binding agent such as for example calcium oxide,
iv) 0 to 10 wt. %, preferably 1 to 4 wt. %, of curing accelerator for epoxies,
v) 0 to 50 wt. %, preferably 5 to 20 wt. %, of toughener.

One or both of the following conditions preferably applies to component B:

The percentage by weight of epoxy prepolymer, relative to the entire component B, is 40 to 80 wt. %, preferably 50 to 65 wt. %;

The percentage by weight of diol or polyol, relative to the entire component B, is 2.5 to 35 wt. %, preferably 4 to 25 wt. %.

It is particularly preferable for both of these conditions to apply simultaneously.

Alternatively, one or both of the following conditions preferably applies to component B:

The percentage by weight of epoxy prepolymer, relative to the entire component B, is 35 to 80 wt. %, preferably 40 to 65 wt. %;

The percentage by weight of diol or polyol, relative to the entire component B, is 2.5 to 35 wt. %, preferably 4 to 25 wt. %.

It is particularly preferable for both of these conditions to apply simultaneously.

Component B preferably contains both epoxy prepolymers that are liquid at 22° C. and epoxy prepolymers that are solid or semi-solid at 22° C. 10 to 40, in particular 20 to 35 wt. % of the total epoxy is preferably liquid, the rest solid.

Component B can additionally contain one or more, preferably all, of the following constituents, relative to the entire component B:
i) 0.5 to 5 wt. %, preferably 1 to 3 wt. %, of heat-activatable blowing agent,
ii) 5 to 30 wt. %, preferably 8 to 20 wt. %, of lightweight filler,
iii) 0.5 to 5 wt. %, preferably 1 to 3 wt. %, of water-binding agent such as for example calcium oxide,
iv) 2 to 15 wt. %, preferably 3 to 10 wt. %, of heat-activatable hardener for epoxies,
v) 0.005 to 0.5 wt. %, preferably 0.02 to 0.1 wt. %, of curing accelerator as described above, in particular dibutyl tin dilaurate.

Alternatively, component B can contain one or more, preferably all, of the following constituents, relative to the entire component B:
i) 0.5 to 5 wt. %, preferably 1 to 3 wt. %, of heat-activatable blowing agent,
ii) 0 to 30 wt. %, preferably 5 to 20 wt. %, of lightweight filler,
iii) 0.5 to 6 wt. %, preferably 1 to 5 wt. %, of water-binding agent such as for example calcium oxide,
iv) 0.5 to 15 wt. %, preferably 1 to 10 wt. %, of heat-activatable hardener for epoxies,
v) 0.005 to 0.5 wt. %, preferably 0.02 to 0.1 wt. %, of curing accelerator for isocyanates as described above, in particular dibutyl tin dilaurate,
vi) 0 to 10 wt. %, preferably 1 to 4 wt. %, of curing accelerator for epoxies, and
vii) 0 to 50 wt. %, preferably 5 to 20 wt. %, of toughener.

The mixtures of substances for use according to the invention generally also contain fillers known per se, such as for example the various ground or precipitated chalks, carbon black, calcium magnesium carbonates, talc, barytes and in particular siliceous fillers of the aluminum magnesium calcium silicate type, e.g. wollastonite, chlorite. Mica-containing fillers can preferably additionally be used, a two-component filler comprising muscovite mica and quartz having a low heavy metals content being most particularly preferred here.

For the purposes of weight reduction the mixture of substances can contain lightweight fillers in addition to the aforementioned "normal" fillers. These can be selected from the group of hollow metal beads such as for example hollow steel beads, hollow glass beads, fly ash (Fillite), hollow plastic beads based on phenolic resins, epoxy resins or polyesters, expanded hollow microbeads with wall material made from (meth)acrylic acid ester copolymers, polystyrene, styrene (meth)acrylate copolymers and in particular polyvinylidene chloride as well as copolymers of vinylidene chloride with acrylonitrile and/or (meth)acrylic acid esters, hollow ceramic beads or organic lightweight fillers of natural origin such as ground nut shells, for example the shells of cashew nuts, coconuts or peanut shells as well as cork meal or coke powder. Lightweight fillers based on hollow microbeads, which in the cured molding matrix ensure a high compressive strength of the molding, are particularly preferred here.

In a particularly preferred embodiment the heat-curable materials additionally contain fibers, based for example on aramid fibers, carbon fibers, metal fibers, made for example from aluminum, glass fibers, polyamide fibers, polyethylene fibers or polyester fibers, these fibers preferably being pulp fibers or staple fibers having a fiber length of between 0.5 and 6 mm and a diameter of 5 to 20 µm. Polyamide fibers of the aramid fiber type or polyester fibers are particularly preferred.

The curable materials according to the invention can furthermore contain further common auxiliary agents and additives, such as for example plasticizers, rheology aids, wetting agents, adhesion promoters, antioxidants, stabilizers and/or colored pigments. The proportions of the individual components can vary within relatively broad limits, depending on the requirements profile in terms of processing properties, flexibility, the required stiffening effect and the adhesive bond to the substrates.

The materials according to the invention can optionally contain reactive thinners for adjusting the flow characteristics. Reactive thinners within the meaning of this invention are low-viscosity substances (glycidyl ethers or glycidyl esters) containing epoxy groups having an aliphatic or aromatic structure. Typical examples of reactive thinners are mono-, di- or triglycidyl ethers of $C_8$ to $C_{14}$ monoalcohols or alkyl phenols and the monoglycidyl ethers of cashew nut shell oil, diglycidyl ethers of ethylene glycol, diethylene glycol, triethylene glycol, tetraethylene glycol, propylene glycol, dipropylene glycol, tripropylene glycol, tetrapropylene glycol, 1,4-butylene glycol, 1,5-pentanediol, 1,6-hexanediol, cyclohexane dimethanol, triglycidyl ethers of trimethylol propane and the glycidyl esters of $C_6$ to $C_{24}$ carboxylic acids or mixtures thereof.

To improve the fracture behavior, in particular at temperatures below 0° C., the two-component preparations according to the invention can contain one or more different tougheners. Such tougheners are known to the person skilled in the art in the field of epoxy adhesives. They can be selected for example from: thermoplastic isocyanates or polyurethanes, rubber particles, in particular those having a core-shell structure, and block copolymers, in particular those containing a first polymer block having a glass transition temperature of less than 15° C. and a second polymer block having a glass transition temperature of greater than 25° C. Such block copolymers are preferably selected from those in which a first polymer block is selected from a polybutadiene or polyisoprene block and a second polymer block is selected from a polystyrene or a polymethyl methacrylate block. Specific examples thereof are block copolymers having the following block structure: styrene-butadiene-(meth)acrylate, styrene-butadiene-(meth)acrylic acid ester, ethylene-(meth)acrylic acid ester-glycidyl (meth) acrylic acid ester, ethylene-(meth)acrylic acid ester-maleic anhydride, methyl methacrylate-butyl acrylate-methyl methacrylate.

Tougheners that are preferred according to the invention are furthermore rubber particles having a core-shell structure with a core made from a polymer material having a glass transition temperature of less than 0° C. and a shell made from a polymer material having a glass transition temperature of greater than 25° C. Particularly suitable rubber particles having a core-shell structure can have a core made from a diene homopolymer, a diene copolymer or a polysiloxane elastomer and/or a shell made from an alkyl (meth) acrylate homopolymer or copolymer.

For example, the core of these core-shell particles can contain a diene homopolymer or copolymer, which can be selected from a homopolymer of butadiene or isoprene, a copolymer of butadiene or isoprene with one or more ethylenically unsaturated monomers, such as for example vinyl aromatic monomers, (meth)acrylonitrile, (meth)acrylates or similar monomers. The polymer or copolymer of the shell can contain as monomers for example: (meth)acrylates, such as in particular methyl methacrylate, vinyl aromatic monomers (for example styrene), vinyl cyanides (for example acrylonitrile), unsaturated acids or anhydrides (for example acrylic acid), (meth)acrylamides and similar monomers, which lead to polymers having a suitable high glass transition temperature.

The polymer or copolymer of the shell can contain acid groups, which can crosslink by metal carboxylate formation, for example by salt formation with divalent metal cations. The polymer or copolymer of the shell can furthermore be covalently crosslinked by using monomers having two or more double bonds per molecule.

Other rubber-like polymers can be used as the core, such as for example polybutyl acrylate or polysiloxane elastomers, such as for example polydimethyl siloxane, in particular crosslinked polydimethyl siloxane.

These core-shell particles are typically constructed in such a way that the core makes up 50 to 95 wt. % of the core-shell particle and the shell makes up 5 to 50 wt. % of this particle.

These rubber particles are preferably relatively small. For example, the average particle size (determinable by light scattering methods for example) can be in the range from approximately 0.03 to approximately 2 µm, in particular in the range from approximately 0.05 to approximately 1 µm. Smaller core-shell particles can however likewise be used, for example those whose average diameter is less than approximately 500 nm, in particular less than approximately 200 nm. The average particle size can for example lie in the range from approximately 25 to approximately 200 nm.

The production of such core-shell particles is known in the prior art, as is indicated for example in WO 2007/025007 on page 6, lines 16 to 21. Commercial supply sources for such core-shell particles are listed in this document in the last paragraph of page 6 to the first paragraph of page 7. Reference is hereby made to these supply sources. Reference is moreover made to production methods for such particles, which are described in the cited document from page 7, second paragraph to page 8, first paragraph. For more information on suitable core-shell particles reference is likewise made to the cited document WO 2007/025007, which contains detailed information on this subject from page 8, line 15 to page 13, line 15.

Inorganic particles having a shell made from organic polymers can take on the same function as the aforementioned rubber particles having a core-shell structure.

In this embodiment the material according to the invention preferably contains inorganic particles having a shell made from organic polymers, the organic polymers being selected from homopolymers or copolymers of acrylic acid and/or methacrylic acid esters and containing at least 30 wt. % of acrylic acid and/or methacrylic acid esters incorporated by polymerization.

The acrylic acid and/or methacrylic acid esters are preferably methyl and/or ethyl esters, wherein at least a proportion of the esters is particularly preferably present as methyl ester. The polymers can additionally also contain unesterified acrylic and/or methacrylic acid, which can improve the binding of the organic polymers to the surface of the inorganic particles. In this case it is therefore particularly preferable for the monomer units of unesterified acrylic and/or methacrylic acid to be located at (or near to) the end of the polymer chain that binds to the surface of the inorganic particles.

It is preferable here for the organic polymers to be made up of at least 80 wt. % acrylic acid and/or methacrylic acid esters. In particular they can be made up of 90 wt. %, 95 wt.

% or entirely thereof. If the organic polymers contain monomers other than said acrylic acid and/or methacrylic acid esters or unesterified acrylic acid and/or methacrylic acid, they are preferably selected from comonomers having epoxy, hydroxyl and/or carboxyl groups.

The organic polymers of the shell are preferably uncrosslinked or so weakly crosslinked that no more than 5% of monomer units of one chain are crosslinked with monomer units of another chain. It can be advantageous here for the polymers in the vicinity of the surface of the inorganic particles to be more strongly crosslinked than those further outside in the shell. In particular the shell is preferably constructed in such a way that at least 80%, in particular at least 90% and particularly preferably at least 95% of the polymer chains are bound by one end to the surface of the inorganic particles.

Before the shell of organic polymers is applied, the inorganic particles preferably have an average particle size in the range from 1 to 1000, in particular in the range from 5 to 30 nm. It is known that the particle size can be determined by light scattering methods and by electron microscopy.

The shell of organic polymers has a lower density than the inorganic particles themselves. The shell of organic polymers preferably has a thickness such that the weight ratio of the inorganic core to the shell of organic polymers is in the range from 2:1 to 1:5, preferably in the range from 3:2 to 1:3. This can be controlled by the choice of reaction conditions when growing the shell of organic polymers onto the inorganic particles.

In general the inorganic particles can be selected from metals, oxides, hydroxides, carbonates, sulfates and phosphates. Mixed forms of oxides, hydroxides and carbonates, such as for example basic carbonates or basic oxides, can also be present. If inorganic particles of metals are chosen, iron, cobalt, nickel or alloys comprising at least 50 wt. % of one of these metals are preferably suitable. Oxides, hydroxides or mixed forms thereof are preferably selected from those of silicon, cerium, cobalt, chromium, nickel, zinc, titanium, iron, yttrium, zirconium and/or aluminum. Mixed forms of these too are possible, such as for example particles of alumosilicates or of siliceous glasses. Zinc oxide, aluminum oxides or hydroxides and $SiO_2$ and the oxide forms of silicon referred to as silica are particularly preferred. The inorganic particles can moreover consist of carbonates, such as for example calcium carbonate, or of sulfates, such as for example barium sulfate.

It is naturally also possible for particles having differently constituted inorganic cores to be present side by side.

The method described in WO 2004/111136 A1 by reference to the example of coating zinc oxide with alkylene ether carboxylic acids can be used for example to produce the inorganic particles having a shell of organic polymers. According to this processing mode the untreated inorganic particles are suspended in a non-polar or scarcely polar solvent, then monomeric or prepolymeric constituents of the shell are added, the solvent is removed, and polymerization is started, radically or photochemically for example. Furthermore, it is possible to proceed in an analogous manner to the production method described in EP 1 469 020 A1, wherein monomers or prepolymers of the shell material are used as the organic coating component for the particles. Furthermore, a production of the encapsulated particles by atom transfer radical polymerization is possible, as described by way of example in relation to the polymerization of n-butyl acrylate onto silica nanoparticles in: G. Carrot, S. Diamanti, M. Manuszak, B. Charleux, J.-P. Vairon: "Atom Transfer Radical Polymerization of n-Butyl Acrylate from Silica Nanoparticles", J. Polym. Sci., Part A: Polymer Chemistry, Vol. 39, 4294-4301 (2001).

Furthermore, production methods as described in WO 2006/053640 can be used. For the present invention inorganic cores should be selected such as are described in WO 2006/053640 from page 5, line 24 to page 7, line 15 along with their production methods. The coating of these cores takes place in an analogous manner to the description given in this document from p. 10, line 22 to p. 15, line 7. The proposal in this document for pretreating the inorganic cores prior to application of the shell by polymerization can also be followed (page 15, lines 9 to 24). It states here in this regard:

"In particular where inorganic cores are used, it may also be preferable for the core to be subjected to pretreatment which enables binding of the shell before the shell is applied by polymerization. This can conventionally consist in a chemical functionalization of the particle surface, as is known from the literature for a very wide variety of inorganic materials. It may preferably involve in particular the application to the surface of such chemical functions which as a reactive chain end allow grafting of the shell polymers. Terminal double bonds, epoxy functions and polycondensable groups can be cited here in particular as examples. The functionalization of hydroxyl group-bearing surfaces with polymers is known for example from EP-A-337 144."

According to the invention the material contains at least one block copolymer as an additional component e). This is preferably selected from those containing a first polymer block having a glass transition temperature of less than 15° C., in particular less than 0° C., and a second polymer block having a glass transition temperature of greater than 25° C., in particular greater than 50° C. Furthermore, block copolymers are suitable that are selected from those in which a first polymer block is selected from a polybutadiene or polyisoprene block and a second polymer block is selected from a polystyrene or a polymethyl methacrylate block.

The block copolymer (e) is selected for example from copolymers having the following block structure: styrene-butadiene-(meth)acrylate, styrene-butadiene-(meth)acrylic acid ester, ethylene-(meth)acrylic acid ester-glycidyl (meth)acrylic acid ester, ethylene-(meth)acrylic acid ester-maleic anhydride, (meth)acrylic acid ester-butyl acrylate-(meth) acrylic acid ester, preferably methyl methacrylate-butyl acrylate-methyl methacrylate.

The aforementioned block copolymers correspond to those which can also be used in the context of the already cited WO 2007/025007. More details thereof and further block copolymers that are also suitable in the context of the present invention can be taken from this document from p. 25, line 21 to p. 26, line 9. Cross-references to documents in which the production of such block copolymers is described can also be found there.

The composition of these block copolymers is defined above by indicating the monomer unit for each block. This should be understood to mean that the block copolymer contains polymer blocks made from the cited monomers. Up to 20 mol % of the cited monomers in the individual polymer blocks can be replaced by other comonomers. This applies in particular to blocks of polymethyl methacrylate.

The cited block copolymers improve the impact strength of the cured materials according to the invention, in particular at temperatures below 0° C.

The mixing ratio of constituents of the two components that are liquid under normal pressure at a maximum temperature of 100° C. to constituents that are solid under said conditions is preferably chosen such that the viscosity of both component A and component B at a temperature of at most 100° C., in particular at most 80° C., is such that they are pumpable, in particular using conventional positive-displacement pumps such as piston or peristaltic pumps. This has to be determined empirically. This property makes it easier to introduce the two components into the mold and to mix the components. Such a mixture of components can be poured or pumped into molds under low pressure. After mixing the two components, dimensional stability is rapidly established in the mold due to the reaction of the isocyanate with the polyol. The time required for this is dependent on the temperature and can be in the range from approximately 5 minutes to approximately one hour, for example. Compositions according to the embodiment examples result in dimensionally stable materials within 10 to 20 minutes at a temperature of 80° C.

The present invention furthermore relates to a method for preparing a heat-expandable and heat-curable epoxy-based material, wherein components A and B described above are mixed together at a temperature in the range from 20 to 100° C. (preferably in the weight ratio 4:1 to 1:4, in particular in the weight ratio 3:1 to 1:3), the mixture is introduced into a mold and is allowed to pre-cure in the mold at a temperature in the range from 20 to 100° C. to form a material that is preferably dimensionally stable up to 40° C.

Mixing can take place at the same time as introduction into the mold. For example, the two components can be conveyed by pumps out of storage vessels, mixed together using a static mixer or a dynamic mixer, and introduced from the mixer into the mold. Multiple molds can be provided here (for example in a tray), which are filled with the mixed components successively or simultaneously (if multiple mixers are provided). The configuration of filled molds in a tray obtained in this way can be delivered to the end user as a retail mold immediately after pre-curing. The configuration of molds can be produced continuously from a roll in the manner of a blister pack and filled with the mixed components, allowing a continuous production process.

The method according to the invention allows a simple, fast and high-volume batch or continuous production of dimensionally stable materials ("moldings"). A simple two-component pumping system rather than the more expensive injection molding line is sufficient for this purpose. Pumping takes place under low pressure such that aluminum or plastic molds can be used, which are much less expensive than injection molds. This allows a cost-effective production of even large moldings or of large numbers of a structural foam. By changing the mold or by providing different molds in a tray, differently shaped dimensionally stable materials ("moldings") can be produced immediately after one another or simultaneously, without the need for a time-consuming mold change as in injection molding.

The present invention thus also encompasses a material that is dimensionally stable at 22° C. obtainable by the cited method. This material is preferably dimensionally stable up to 40° C. The term "dimensionally stable" means here that a molding made from this material does not deform under the influence of gravitational force. Deformation under pressure is however possible, and can even make it easier to insert the moldings into the cavities to be reinforced.

The main application of the moldings obtainable according to the invention is the stiffening and reinforcement of component parts, in particular component parts for white goods, or of body component parts such as body frames, doors, trunk lids, engine hoods and/or roof sections in automotive construction. The present invention thus also encompasses a method for reinforcing and/or insulating a component part, in particular a hollow component part, wherein the dimensionally stable material described above is applied to the component part or introduced into the hollow component part and expanded and cured at a temperature in the range from 120 to 220° C., preferably for a period in the range from 10 to 150 minutes.

For this method use is made of the conventional production process for elongated hollow structures in automotive construction, for example for the frame enclosing the passenger compartment. These hollow structures are conventionally manufactured by producing two correspondingly shaped half-shells from metal and joining these half-shells together to form the hollow frame structure or a part thereof. Such hollow structures or hollow sections are for example the A-, B- or C-pillar of a car body, which supports the roof structure, or roof pillars, door sills and parts of the wheel housing or engine mount. As is conventional with the use of "pillar fillers" or "baffles" in such hollow structures in the prior art, the moldings obtained according to the invention can be attached to the surface of one half-shell that will later become the inside wall of the cavity by means of a fixing element or an adhesive surface area, before this half-shell is joined to the other half-shell to form the hollow structure.

The molding obtained according to the invention is preferably shaped in such a way that its cross-section viewed perpendicular to the longitudinal axis corresponds to the cross-sectional shape of the cavity.

The molding is however dimensioned in such a way that before it is expanded it is in contact at only one or a few points with the inside wall of the hollow component. Apart from these points there remains a flow gap with a width from approximately 1 to approximately 10 mm, preferably from approximately 2 to approximately 4 mm, between the boundary surfaces lying parallel to the longitudinal axis of the molding and the inside walls of the hollow component. This flow gap ensures that the various process liquids with which the body in white is treated can wet all parts of the inner sides of the cavity walls. The flow gap only closes on thermal expansion of the molding, allowing said molding to achieve its intended purpose of reinforcing, insulating, damping and/or sealing the hollow component parts. Spacers on the moldings can ensure that this flow gap is reliably formed prior to expansion of the molding and is retained up to the point of expansion.

EXAMPLES

Embodiment examples (composition in wt. % relative to the entire composition of components A and B).

Components A and B are prepared by mixing the raw materials, mixed together at 80° C. and poured into molds. Within 15 minutes of mixing and subsequent cooling to 40° C., pre-curing at 80° C. leads to a dimensionally stable material which expands and cures at 130° C. to give a solid foam that meets the requirements of a structural foam.

Example 1

| Material | Component A | Component B |
| --- | --- | --- |
| Epoxy prepolymer 1 (liquid at 22° C.) | 36.0 | 10.13 |
| Dicyandiamide | — | 4.43 |
| Epoxy resin-amine adduct (Ajicure ™ PN 50) | — | 1.5 |
| Epoxy prepolymer 2, based on bisphenol A/ epichlorohydrin, solid at 22° C. | — | 50.08 |

-continued

| Material | Component A | Component B |
|---|---|---|
| Chalk (uncoated) | 5.06 | 0.35 |
| Expandable hollow plastic microbeads (heat-activatable blowing agent) | 4.2 | 2.1 |
| Hollow glass microbeads (lightweight filler) | 25.54 | 12.55 |
| Calcium oxide (water-binding agent) | 3.0 | 1.5 |
| Branched polyalcohol with ester and ether groups (Desmophen ™ 1145) | — | 17.36 |
| Diphenylmethane-4,4'-diisocyanate (contains isomers and homologs) | 26.1 | — |
| Dibutyl tin dilaurate | 0.10 | — |

Weight-related mixing ratio: A:B = 1:2

Example 2

| Material | Component A | Component B |
|---|---|---|
| Epoxy prepolymer 1 (liquid at 22° C.) | 36.0 | 10.4 |
| Dicyandiamide | — | 4.43 |
| Epoxy resin-amine adduct (Ajicure ™ PN 50) | 3.0 | — |
| Epoxy prepolymer 2, based on bisphenol A/epichlorohydrin, solid at 22° C. | — | 48.74 |
| Chalk | 34.83 | 14.66 |
| Expandable hollow plastic microbeads (heat-activatable blowing agent) | 3.6 | 1.8 |
| Hollow glass microbeads (lightweight filler) | 9.45 | 13.28 |
| Calcium oxide (water-binding agent) | 3.0 | 1.5 |
| Trifunctional polyethylene polyether polyol (Desmophen ™ 1240 BT) | — | 5.14 |
| Diphenylmethane-4,4'-diisocyanate (contains isomers and homologs) | 10.12 | — |
| Dibutyl tin dilaurate | — | 0.05 |

Weight-related mixing ratio: A:B = 1:2

The invention claimed is:

1. A method for preparing a heat-expandable and heat-curable epoxy-based material, wherein a component A and a component B are mixed together at a temperature in the range from 20 to 100° C., the mixture is introduced into a mold and is allowed to pre-cure in the mold at a temperature in the range from 20 to 100° C. to form a material that is dimensionally stable up to 40° C., wherein component A contains at least one isocyanate and component B contains at least one diol or polyol selected from the group consisting of aliphatic diols, polyether polyols, polyester polyols and combinations thereof, at least one of components A or B contains at least one epoxy prepolymer, at least one of components A or B contains a heat-activatable hardener for epoxy prepolymers, and at least one of components A and B contains a heat-activatable blowing agent, and wherein the constituents of each of component A and component B are chosen such that component A and component B each have a viscosity such that each of component A and component B is pumpable at a temperature of at most 100° C.

2. The method according to claim 1, wherein:
   component A contains at least one difunctional isocyanate, and
   component B contains at least one epoxy prepolymer.

3. The method according to claim 1, wherein component A additionally contains one or more of the following constituents, relative to the entire component A:
   i) 2 to 10 wt. %, of heat-activatable blowing agent,
   ii) 5 to 20 wt. %, of lightweight filler,
   iii) 1 to 5 wt. %, of water-binding agent,
   iv) 1 to 4 wt. %, of curing accelerator for epoxies,
   v) 5 to 20 wt. %, of toughener.

4. The method of claim 1, wherein component A contains at least one isocyanate, component B contains at least one epoxy prepolymer and at least one diol or polyol, at least one of components A or B contains a heat-activatable hardener

| | Example 3 | | Example 4 | | Example 5 | | Example 6 | | Example 7 | |
|---|---|---|---|---|---|---|---|---|---|---|
| Raw material | Comp. A | Comp. B | Comp. A | Comp. B | Comp. A | Comp. B | Comp. A | Comp. B | Comp. A | Comp. B |
| D.E.R. 331 ® | 28.5 | 35.1 | — | 44.9 | — | 38 | — | 51.9 | — | 51.3 |
| D.E.R. 671 ® | — | 38 | — | — | — | 10 | — | — | — | — |
| Desmodur ® VL R10 | 15 | — | 80 | — | 35 | — | 45 | — | 52 | — |
| 1,4-Butanediol | — | 5 | — | 2.7 | — | 3 | — | 3.8 | — | 4.4 |
| Calcium oxide | 4 | 4 | 4 | 4 | 4 | 4 | 4 | 4 | 4 | 4 |
| Hollow glass beads 3M VS5500 | 15 | — | — | 10 | — | — | — | — | — | — |
| Omyacarb ® 4HD | 35 | — | 15.9 | 30 | 61 | 36.2 | 51 | 31.9 | 44 | 31.9 |
| Expancel ® 909 DU80 | 2.4 | 2.4 | — | 2.4 | — | 3 | — | 1.5 | — | 1.5 |
| Dicyanamide | — | 8.6 | — | 5.0 | — | 4.7 | — | 5.8 | — | 5.8 |
| Ajicure ® PN50 | — | 1.8 | — | 1 | — | 1 | — | 1 | — | 1 |
| Zinc-amine salt (accelerator for isocyanate) | — | 0.1 | — | 0.1 | — | 0.1 | — | 0.1 | — | 0.1 |
| Dye | 0.1 | | 0.1 | | — | — | 0.1 | | — | 0.1 |
| Total | 100 | 95.0 | 100 | 100 | 100 | 100 | 100 | 100 | 100 | 100 |
| Mixing ratio | 1 | 1 | 1 | 10 | 1 | 4 | 1 | 4 | 1 | 4 |
| PU content (%) | 10 | | 9.7 | | 9 | | 12 | | 14 | |
| Density after pre-curing | 1.04 | | 1.06 | | 1.28 | | 1.43 | | 1.32 | |
| Density after final curing | 0.27 | | 0.35 | | 0.41 | | 1.00 | | 1.00 | |
| Expansion | 280% | | 200% | | 215% | | 40% | | 30% | |
| Shore A hardness | 80 | | 70 | | 73 | | 93 | | 93 | |

List of raw materials used:
Ajicure ® PN50 Amine adduct with epoxy resin; latent hardener and accelerator for epoxy resins; manufactured by Ajinomoto
D.E.R. 331 ® Reaction product of bisphenol A with epichlorohydrin; liquid at room temperature; EEW 187 g/eq; manufactured by Dow
D.E.R. 671 ® Reaction product of bisphenol A with epichlorohydrin; solid at room temperature; EEW approx. 500 g/eq; manufactured by Dow
Desmodur ® VL R10 Aromatic polyisocyanate based on diphenylmethane diisocyanate; manufactured by Bayer
Expancel ® 909 DU80 Expandable hollow microbeads made from acrylonitrile, methacrylonitrile and methyl methacrylate copolymers; manufactured by Expancel
Omyacarb ® 4HD Calcium carbonate (limestone powder); manufactured by Omya GmbH for epoxy prepolymers, and at least one of components A or B contains a heat-activatable blowing agent.

5. The method of claim 1, wherein component A is free from epoxy resins.

6. The method of claim 1, wherein one or both of the following conditions applies to the composition of component B:
   the percentage by weight of epoxy prepolymer, relative to the entire component B, is 35 to 80 wt. %;
   the percentage by weight of diol or polyol, relative to the entire component B, is 2.5 to 35 wt. %.

7. The method of claim 1, wherein at least one of components A and B contains an epoxy prepolymer that is liquid at 22° C.

8. The method of claim 1, wherein component A and component B are mixed in a weight ratio of 4:1 to 1:4.

9. The method of claim 1, wherein component B additionally contains one or more of the following constituents, relative to the entire component B:
   i) 0.5 to 5 wt. %, of heat-activatable blowing agent,
   ii) 0 to 30 wt. %, of lightweight filler,
   iii) 0.5 to 6 wt. %, of water-binding agent,
   iv) 0.5 to 15 wt. %, of heat-activatable hardener for epoxies,
   v) 0.005 to 0.5 wt. %, of curing accelerator for isocyanates,
   vi) 0 to 10 wt. %, of curing accelerator for epoxies, and
   vii) 0 to 50 wt. %, of toughener.

10. The method according to claim 7, wherein at least one of components A and B additionally contains an epoxy prepolymer that is solid or semi-solid at 22° C.

11. The method of claim 1, wherein the at least one diol or polyol is 1,4-butanediol, a trifunctional polyethylene polyether polyol or a combination thereof.

12. The method of claim 1, wherein the percentage by weight of diol or polyol, relative to the entire component B, is 4 to 25 wt. %.

13. The method of claim 1, wherein component B contains at least one epoxy prepolymer and the percentage by weight of epoxy prepolymer, relative to the entire component B, is 50 to 65 wt. %.

14. The method of claim 1, wherein component A additionally contains filler and water-binding agent.

* * * * *

UNITED STATES PATENT AND TRADEMARK OFFICE
CERTIFICATE OF CORRECTION

| | |
|---|---|
| PATENT NO. | : 9,464,153 B2 |
| APPLICATION NO. | : 13/456707 |
| DATED | : October 11, 2016 |
| INVENTOR(S) | : Martin Hornung, Emilie Barriau and Martin Renkel |

Page 1 of 1

It is certified that error appears in the above-identified patent and that said Letters Patent is hereby corrected as shown below:

In the Specification

Column 5, Line 24: After "of", insert -- > --.

Column 8, Line 19: Change "Dualite" to -- "Dualite®" --.

Column 11, Line 19: Change "$C_8$" to -- $C_6$ --.

Signed and Sealed this
Thirtieth Day of May, 2017

Michelle K. Lee
*Director of the United States Patent and Trademark Office*